(12) United States Patent
Liu et al.

(10) Patent No.: US 8,220,932 B2
(45) Date of Patent: Jul. 17, 2012

(54) DRY ERASABLE PROJECTION ARTICLE AND SYSTEM

(75) Inventors: Yufeng Liu, Woodbury, MN (US); Encai Hao, Woodbury, MN (US); David T. Yust, Woodbury, MN (US); Lan H. Liu, Rosemount, MN (US); Frederick J. Gustafson, Bloomington, MN (US); Willem V. Bastiaens, Medina, MN (US); Yu Yang, Eden Prairie, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 372 days.

(21) Appl. No.: 12/684,565

(22) Filed: Jan. 8, 2010

(65) Prior Publication Data

US 2010/0171929 A1    Jul. 8, 2010

Related U.S. Application Data

(60) Provisional application No. 61/170,993, filed on Apr. 20, 2009, provisional application No. 61/143,275, filed on Jan. 8, 2009.

(51) Int. Cl.
| | |
|---|---|
| *G03B 21/26* | (2006.01) |
| *G03B 21/28* | (2006.01) |
| *G03B 21/56* | (2006.01) |
| *G03B 21/60* | (2006.01) |
| *G02B 27/14* | (2006.01) |
| *G02F 1/1335* | (2006.01) |
| *H01K 1/26* | (2006.01) |
| *F21V 9/14* | (2006.01) |
| *B43L 1/00* | (2006.01) |

(52) U.S. Cl. ......................................................... 353/29
(58) Field of Classification Search .................... 353/29, 353/30, 98; 359/838, 449, 452; 349/113; 313/116; 362/19; 434/408
See application file for complete search history.

(56) References Cited

U.S. PATENT DOCUMENTS

| | | | |
|---|---|---|---|
| 3,549,463 | A | 12/1970 | Frech |
| 4,068,922 | A | 1/1978 | Dotsko |
| 5,200,853 | A | 4/1993 | Berkman |
| 5,361,164 | A | 11/1994 | Steliga |
| 5,534,386 | A | 7/1996 | Petersen |
| 5,552,927 | A | 9/1996 | Wheatly |
| 5,867,316 | A | 2/1999 | Carlson |
| 5,903,392 | A | 5/1999 | Kojima |

(Continued)

FOREIGN PATENT DOCUMENTS

EP          1398660         3/2004

(Continued)

OTHER PUBLICATIONS

Search Report of PCTUS2010/020506, 3 pages.

(Continued)

*Primary Examiner* — Georgia Y Epps
*Assistant Examiner* — Magda Cruz
(74) *Attorney, Agent, or Firm* — Robert H. Jordan (57) ABSTRACT

A communication article and system comprising a writing member having a dry erasable front surface and a projection member is disclosed. The projection member includes an asymmetric optical diffuser that scatters light in a first direction with a first viewing angle $A_H$, and in a second direction orthogonal to the first direction with a second viewing angle $A_V$. The ratio $A_H/A_V$ is at least about 2.

24 Claims, 3 Drawing Sheets

U.S. PATENT DOCUMENTS

| | | | |
|---|---|---|---|
| 5,956,106 A | 9/1999 | Petersen | |
| 6,031,665 A | 2/2000 | Carlson | |
| 6,067,266 A | 5/2000 | Donelan | |
| 6,091,469 A | 7/2000 | Naito | |
| 6,123,877 A | 9/2000 | Clabburn | |
| 6,141,149 A | 10/2000 | Carlson | |
| 6,299,799 B1 | 10/2001 | Craig et al. | |
| 6,352,759 B2 | 3/2002 | Savant | |
| 6,381,068 B1 | 4/2002 | Harada | |
| 6,404,548 B1 | 6/2002 | Tatsuki | |
| 6,476,965 B1 | 11/2002 | He et al. | |
| 6,482,336 B2 | 11/2002 | Savant | |
| 6,497,946 B1 | 12/2002 | Kretman | |
| 6,529,322 B1 | 3/2003 | Jones | |
| 6,590,705 B1 | 7/2003 | Allen | |
| 6,700,702 B2 | 3/2004 | Sales | |
| 6,802,188 B1 | 10/2004 | Lieberman | |
| 6,847,425 B2 * | 1/2005 | Tanada et al. | 349/113 |
| 6,987,612 B2 | 1/2006 | Allen | |
| 7,278,775 B2 | 10/2007 | Yeo | |
| 7,399,184 B2 | 7/2008 | Hester et al. | |
| 7,408,707 B2 | 8/2008 | Yeo | |
| 7,431,489 B2 | 10/2008 | Yeo | |
| 7,453,635 B2 | 11/2008 | Yeo | |
| 7,453,636 B2 | 11/2008 | Yeo | |
| 7,542,635 B2 | 6/2009 | Coleman | |
| 7,914,192 B2 | 3/2011 | Coleman | |
| 8,007,118 B2 | 8/2011 | O'Neill | |
| 2001/0048495 A1 * | 12/2001 | Yamaguchi et al. | 349/113 |
| 2002/0126378 A1 | 9/2002 | Cho | |
| 2004/0150883 A1 | 8/2004 | Shimoda | |
| 2004/0240053 A1 | 12/2004 | Shimoda | |
| 2004/0240054 A1 | 12/2004 | Aiura | |
| 2004/0252373 A1 | 12/2004 | Umeya | |
| 2005/0030480 A1 | 2/2005 | Lippey | |
| 2005/0190442 A1 | 9/2005 | Lippey | |
| 2005/0207007 A1 | 9/2005 | Shimoda | |
| 2005/0225687 A1 | 10/2005 | Yamauchi | |
| 2005/0286124 A1 | 12/2005 | Ma | |
| 2006/0290253 A1 | 12/2006 | Yeo | |
| 2007/0030415 A1 | 2/2007 | Epstein | |
| 2007/0035827 A1 * | 2/2007 | Shimoda et al. | 359/449 |
| 2008/0030882 A1 | 2/2008 | Ichikawa | |

FOREIGN PATENT DOCUMENTS

| | | |
|---|---|---|
| JP | 2000-221601 | 8/2000 |
| JP | 2005-107096 | 4/2005 |
| WO | 97-30373 | 8/1997 |
| WO | 99-21913 | 5/1999 |
| WO | WO 02/086618 A1 | 10/2002 |
| WO | 2006-017585 | 2/2006 |
| WO | 2006-020583 | 2/2006 |
| WO | 2006-031545 | 3/2006 |
| WO | 2006-032002 | 3/2006 |
| WO | 2006-055873 | 5/2006 |
| WO | 2006-124588 | 11/2006 |
| WO | 2008-024617 | 2/2008 |
| WO | 2008-061027 | 5/2008 |
| WO | 2008-061054 | 5/2008 |
| WO | 2008-061059 | 5/2008 |
| WO | 2008-061061 | 5/2008 |
| WO | 2008-061125 | 5/2008 |
| WO | WO 2010/080775 A1 | 7/2010 |
| WO | 2011-063236 | 5/2011 |

OTHER PUBLICATIONS

Khaineman, Plasticheskie Massy, vol. 11, 1984, pp. 40-42, w-abs.

Wenig, Crystallization kinetics of isotactic polypropylene blended with atactic polystyrene, Colloid and Polymer Science, (1990), vol. 268, No. 6, pp. 528-535.

Written Opinion for PCT/US2010/057431, mailed on Mar. 7, 2011, 7 pages.

Intl Search Report for PCT/US2010/020176, mailed on May 11, 2010, 4 pages.

Written Opinion for PCT/US2010/020506, corrected version, mailed on Feb. 24, 2010, 5 pages.

* cited by examiner

DRY ERASABLE PROJECTION ARTICLE AND SYSTEM

CROSS-REFERENCE TO RELATED APPLICATIONS/PRIORITY CLAIM

This application claims priority to and incorporates by reference in their entirety, U.S. Provisional Application Nos. 61/170,993, filed Apr. 20, 2009, and 61/143,275, filed Jan. 8, 2009.

FIELD OF THE INVENTION

This invention generally relates to a communication article which is capable of being used as a dry erase board and as a projection screen that is able to project image with high contrast, high brightness, and wide viewing angle.

BACKGROUND

Office environments are usually occupied with a writing board such as a chalk or dry erase board and a projector screen. Businesses are often changing their facilities to accommodate changes in personal and business needs. Often rooms are redesigned to provide conference rooms which were once personal office space. Conference rooms previously contained both a writing board and a projection screen. It is desirable to provide a single article which can meet the need for both the writing surface and projection screen.

Dry erase boards have been used as a writing surface for years because of their convenience and versatility. The boards provide a means for expression which eliminates the mess and trouble of a chalk board. Known boards however are not useful as projection surfaces because of the glare associated with the surface of the dry erase board. If the ordinary dry erase board was used as the projection surface the glare and reflection of the projection bulb leads to eye strain and fatigue to the viewers. Furthermore, these boards generally do not have enough brightness and contrast, particularly under bright ambient light conditions.

It is desirable to have a multi functional article which acts effectively as a dry erase board and a projection screen that can projects image with high brightness, high contrast, and wide viewing angle.

U.S. Pat. No. 5,200,853 (Berkman) discloses a durable multipurpose screening board based on melamine, which comprises an upper section comprising at least two superposed layers of transparent overlay sheets, each of the sheets weighing between 2 and 120 grams per square meter and having been soaked in a solution or melt of a polymeric resin material to subsequently form an intermediate solid plastic layer, the upper surface of the upper sheet being roughened by a plurality of closely-spaced complementary depressions of the depth between 0.01 mm and 0.2 mm, the core section comprising a paper sheet weighing between 60 and 140 grams per square meter and having soaked in a solution or melt of a polymeric resin material to subsequently form an intermediate solid plastic layer. The disclosed screen has low optical gain similar to a white board. It is not high enough to project high contrast, high brightness image under bright ambient light.

U.S. Pat. No. 5,361,164 (Steliga) discloses a projection markerboard having a bi-directional lenticular embossed surface. The light reflecting writing surface is preferably made of a thin film of fluoropolymer, such as a modified copolymer of ethylene and tetrafluoroethylene. The disclosed screen has low optical gain similar to that of a typical white board. It is not high enough to project a high contrast, high brightness image under a bright ambient light.

U.S. Pat. No. 6,476,965 (He et al.) discloses an article useful as a dry erasable substrate and projection screen comprising a top layer which is dry erasable and has a 60° gloss of less than about 60. The disclosed screen has low optical gain similar to a white board. It is not high enough to project high contrast, high brightness image under a bright ambient light.

Display devices generally display information to a viewer. The performance of a display is described in terms of various characteristics of the display. One such characteristic is the ability of the display to absorb ambient light originated from various sources of light such as a light bulb in a room or on a street or the sun. Generally, ambient light that is incident on a display and not absorbed by the display is superimposed on the displayed information resulting in reduced image contrast. The reduced contrast due to ambient light is generally referred to as washout. Washout is especially a concern in applications where the ambient light is very bright. For example, in a room where a dry erase board and a screen is used where ceiling lights and window light are strong, washout of a projected image is not solved by the previously disclosed dual function boards cited above.

Another characteristic of a display is the viewing angle. It is generally desirable that the displayed information be easily viewable over a predetermined range of viewing angles along the horizontal and vertical directions. As one display characteristic is improved, one or more other display characteristics often degrade. As a result, certain tradeoffs are made in a display device in order to best meet the performance criteria for a given display application. Thus, there remains a need for a dry erase board that is able to project image with high brightness, high contrast and wide viewing angle under strong or bright ambient light conditions.

SUMMARY OF THE INVENTION

The present invention provides communication articles that can be used as dry erase boards and as projection screens capable of projecting images of high brightness, high contrast, and wide viewing angle. Systems employing such articles in accordance with the invention enable clear, easy visibility of written and projected images, e.g., in meetings, seminars, classes, lectures, presentations, etc.

In brief summary, communication articles of the invention comprise a writing member and a projection member disposed to the rear thereof. The front surface of the writing member is dry erasable. The projection member is capable of projecting images through the writing member, preferably with high brightness, high contrast, and wide viewing angle such that the communication article can be used in a variety of ambient lighting conditions.

In illustrative embodiments, articles of the invention comprise a writing member having front and rear surfaces wherein the front surface is capable of being used as a dry erase surface and a projection member disposed on the rear major surface of the writing member wherein the projection member comprises an asymmetric optical diffuser that scatters light in a first direction with a first viewing angle $A_H$, and in a second direction orthogonal to the first direction with a second viewing angle $A_V$, where the ratio $A_H/A_V$ is at least about 2. The projection member also includes a substantially specular reflector that reflects light that is not scattered by the asymmetric optical diffuser. The substantially specular reflector has a first reflectance $R_o$ at a substantially zero incident angle and a second reflectance $R_{45}$ at a substantially 45° incident angle, where the ratio $R_o/R_{45}$ is at least about 1.5. In some embodiments, the light diffusing optical construction also further includes on the rear side of the specular reflector a light absorbing layer that absorbs light that is not reflected by the substantially specular reflector. Such projection members are disclosed in U.S. Provisional Application No. 61/143,275 filed Jan. 8, 2009.

System embodiments of such projection articles would comprise an image projecting light source that projects an image light generally along a first direction onto an image plane. The first direction makes an angle $\theta_1$ with the horizontal direction. The projection system may also include an ambient light source that emits ambient light generally along a second direction that makes an angle $\theta_2$ with the horizontal direction. An advantage of the present invention is that it ameliorates the impairment of visibility of written and projected images that such ambient light frequently imparts. The projection system also includes an asymmetric optical diffuser that is placed in the image plane and has a first viewing angle $A_H$ along the horizontal direction and a second viewing angle $A_V$ along the vertical direction. The ratio $A_H/A_V$ is at least about 2. $A_V$ is greater than $\theta_1$ and smaller than $\theta_2$. The projection system also includes a substantially specular reflector that reflects light that is not scattered by the asymmetric optical diffuser. The substantially specular reflector has a first reflectance $R_1$ at the incident angle of about $\theta_1$ and a second reflectance $R_2$ at the incident angle of about $\theta_2$, where $R_1/R_2$ is at least about 1.5.

BRIEF DESCRIPTION OF DRAWINGS

The invention may be more completely understood and appreciated in consideration of the following detailed description of various embodiments of the invention in connection with the accompanying drawings, in which:

FIG. 5 is a schematic top-view of a structured surface; and.

In the specification, a same reference numeral used in multiple figures refers to the same or similar elements having the same or similar properties and functionalities. The drawings are not to scale and are used for illustrative purposes only.

DETAILED DESCRIPTION OF ILLUSTRATIVE EMBODIMENTS

Figure 6:
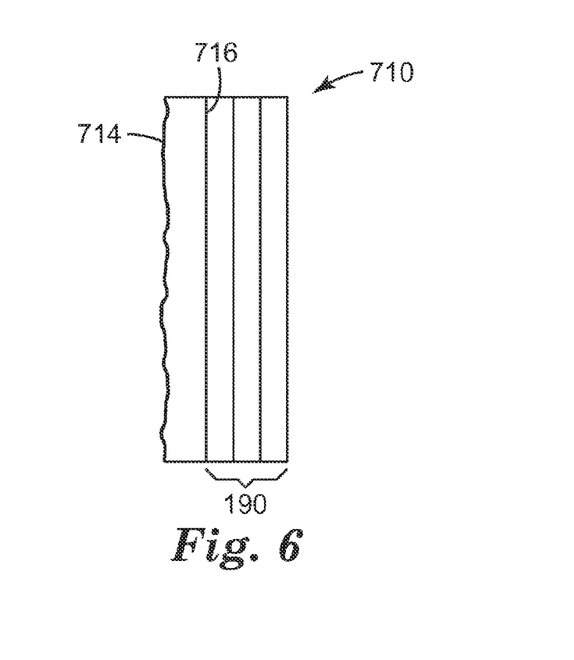
FIG. 6 is a schematic side view of an illustrative communication article of the invention.

A schematic side view of a illustrative communication article of the invention is shown in FIG. 6 wherein communication article 710 comprises writing member 712 and projection member 190 on the rear major surface 716 thereof. Writing member 712 and projection member 190 may be in direct contact, e.g., held together self-adhereingly, with an intermediate adhesive, preferably of high optical clarity, with mechanical means such as a frame or clips, etc.

Depending in part upon the materials selected, the writing member may be formed direction on the front surface of the projection member, e.g., by coating, or they may be formed separately and then assembled into optical arrangement.

Figure 1:
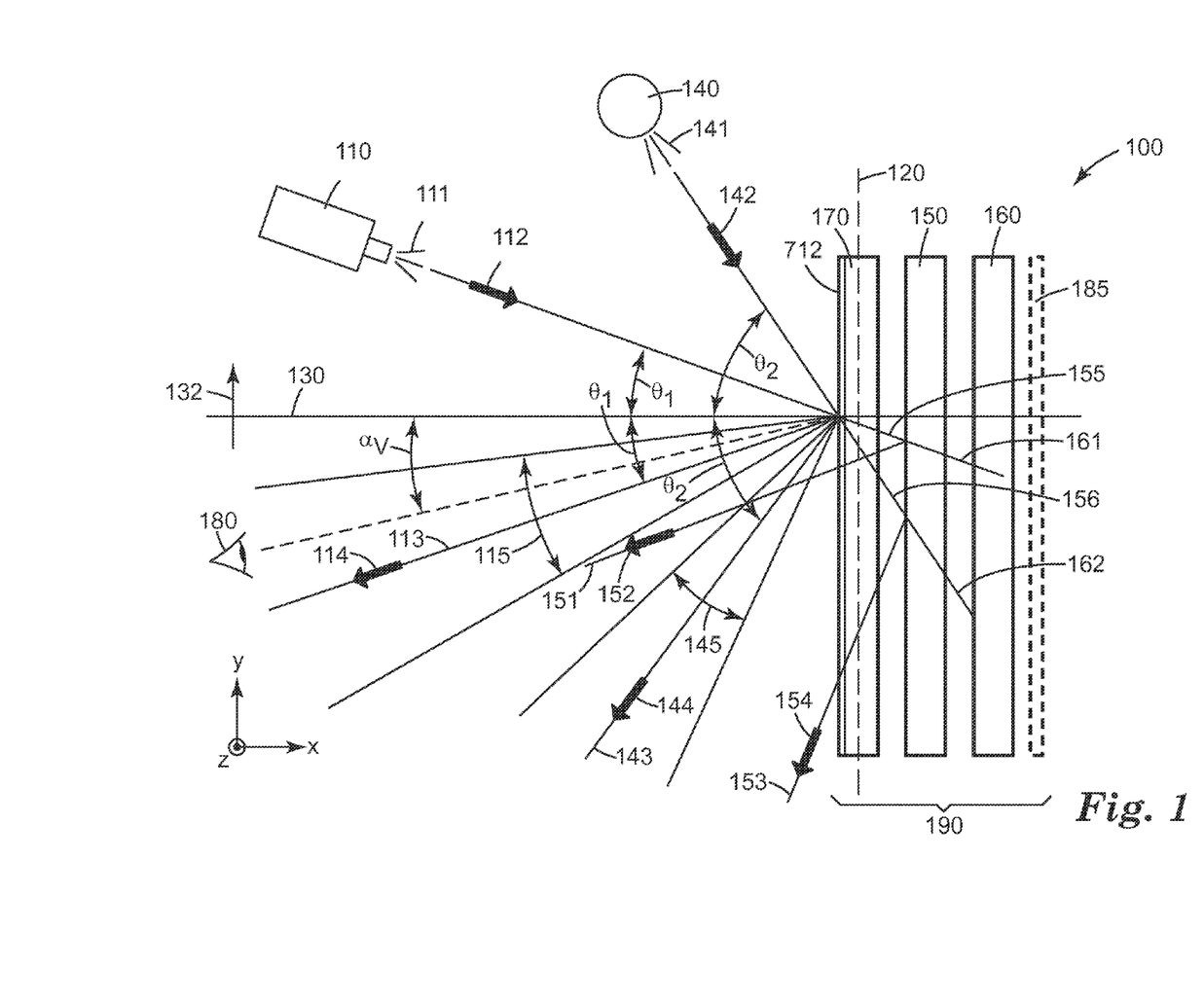
FIG. 1 is a schematic view of use of an illustrative dry erasable projection system of the invention.

As used herein, terms such as "vertical", "horizontal", "above", "below", "left", "right", "upper" and "lower", "front" and "back", "clockwise" and "counter clockwise" and other similar terms, refer to relative positions as shown in the figures. In general, a physical embodiment can have a different orientation, and in that case, the terms are intended to refer to relative positions modified to the actual orientation of the device. For example, even if the construction in FIG. 1 is rotated by 90° as compared to the orientation in the figure, arrow direction 130 is still considered to be along the "horizontal" direction.

Writing Member

Writing member 712 has a front major surface 714 which is capable of being used as a dry erasable writing surface. Suitable materials can be readily selected by those skilled in the art. Writing member 712 must be dry erasable and transparent. Typically the writing member has a transparency of at least 70% to visible light, preferably at least 80%.

Acceptance of ink on writing member 712 as written indicia without beading of the ink can be defined as the "wettability" of the dry erase writing surface. Wettability refers to a writing line that can retain its shape as the solvent dries. Dewetting of the solvent causes the line to move in or break at certain points, causing voids in the writing. Acceptable wettability (or writing without dewetting) is accomplished if the surface energy of the writing surface is greater than the surface tension of the solvents in the marker inks. The writing surface additionally provides a level of "erasability" which allows the user to wipe away (e.g. with a dry cloth or dry eraser) indicia written with a dry erase marker once it is no longer desired. Acceptable erasability is achieved if the surface energy of the writing surface is sufficiently low to prevent tenacious adhesion of the binders and other solids in the marker inks to the writing surface. Solvent compositions of dry erase markers are typically listed on the marker or reported on the MSDS for the marker. Common solvents for dry erase markers include, for example, ethanol, isopropanol, methyl isobutyl ketone and n-butyl acetate. One solvent with a high surface tension is n-butyl acetate, having a surface tension of about 25 mJ/m$^2$. Therefore, in some embodiments, a dry ease surface can be wettable by solvents with a surface tension of about 25 mJ/m$^2$ or less. In one embodiment, the surface energy of the writing surface is within the range of about 25 mJ/m$^2$ to about 40 mJ/m$^2$. In another embodiment, the surface energy of the writing surface is within the range of about 30 mJ/m$^2$ to about 35 mJ/m$^2$, as measured by the Dyne Pen Test. In the current inventive dry erase article, writing surface is easily erasable with a simple felt eraser.

It is desirable for writing member 712 to have a surface energy of greater than or equal to about 25 mJ/m$^2$. This surface energy of writing surface prevents ink from typical dry erase and permanent markers from beading up on the writing surface. Written indicia is received as a continuous layer, preventing beading up or "gaps" in the lines forming written indicia. Typical marker solvents include ethanol, isopropanol, methyl isobutyl ketone, n-butyl acetate, ethyl acetate, n-propanol, and n-butanol. In order for the marker to completely wet out the dry erase surface without beading up, the surface energy of the dry erase surface must be greater than the surface tension of the solvents in the maker. The solvent in the list above with the highest surface tension is n-butyl acetate, with a surface tension of about 25 mJ/m$^2$. Therefore, in one embodiment, the writing surface of the dry erase article has a surface energy greater than or equal to about 25 mJ/m$^2$. In an alternate embodiment, the writing surface of the dry erase article has a surface energy greater than or equal to about 30 mJ/m$^2$ as measured by the Dyne Pen Test. Additionally, written indicia can preferably be quickly removed from dry erase article with a minimum of wiping and a minimum of absorbance of ink (or "ghosting") by dry erase article. Acceptable removability of the ink is achieved if the surface energy of the writing surface is sufficiently low to prevent the binders and other solids in the marker inks from adhering tenaciously to the writing surface. Therefore, in one embodiment, the writing surface of the dry erase article has a surface energy less than or equal to about 40 mJ/m². In an alternate embodiment, the writing surface of the dry erase article has a surface energy less than or equal to about 35 mJ/m².

Illustrative examples of suitable materials for use in the writing surface are sheets and films of transparent polymeric resins, including both thermoplastic and thermoset resins that are coated with a radiation curable hardcoat. Example polymeric resins suitable for use include polyesters, polyethers, polyamides, polyurethanes, polyacrylates, polyethylene, polypropylene, polyvinyls, cellulose esters, epoxy resins, phenolic resins, and the like. Illustrative examples of commercially flexible dry erase surfaces ultraviolet radiation (UV) curable hardcoat films Exemplary polyester films with a UV curable hardcoat are available from Protect-all, Inc., Darien, Wis. UV curable hardcoat film dry erase boards are commercially available from ACCO World Corporation, Lincolnshire, Ill.

Depending upon the embodiments the writing member typically has a thickness of from about 0.5 to about 3 mils though those having dimensions outside this range may be used if desired. In many embodiments, the index of refraction of the writing member will be between about 1.45 and about 1.70.

The front surface of the writing member may be substantially smooth or slightly roughened as desired. As is known to those skilled in the art of dry erasable surfaces, slight texturing or roughening of the surface, e.g., such as be embossing or other suitable means, may be used to achieve reductions in glare and optimize writability and erasability performance. For example, in some embodiments, the front surface of the writing member of articles of the invention will have an average surface roughness Ra ranging from about 60 to about 1000, as measured by a contacting stylus profilometer.

In addition to films with UV curable hardcoats, it is possible to directly coat a UV curable coating formulation on the projection member. Exemplary UV curable formulations comprise multi functional acrylate monomers, multifunctional urethane acrylate monomers, monofunctional acrylate monomers and a UV initiator. In addition to these materials, the UV curable formulation may contain particles or flatting agents. The surface energy of the cured formulation may be reduced by the addition of fluorine or silicone containing monomers.

In one embodiment, the projection screen is coated with a UV curable hardcoat formulation and then cured with UV light to form a dry erasable projection screen.

Projection Member

Disposed on the rear surface 716 of writing member 712 is projection member 190, sometimes referred to herein as the light diffusing optical construction.

The projection members used in articles of the present invention provide asymmetric projection of incident light such that they redirect a desired light, i.e., light from an image projector, to a viewer, and redirect undesired light, such as light from ambient light sources such as windows or doors, overhead lights, etc., away from the viewer. As a result, communication articles of the present invention are particularly suited for use in brightly lit environments, improving the clarity and visibility of written and projected images in otherwise challenging settings.

FIG. 1 is a schematic side-view of a dry erasable projection system 100 that generally defines three orthogonal axes x, y and z. Projection system 100 includes an image projecting light source 110, an ambient light source 140, and, on the rear surface of writing member 712, a light diffusing optical construction 190 that includes an asymmetric optical diffuser 170, a substantially specular reflector 150, and a light absorbing layer 160.

Image projecting light source 110 projects an image light 111 generally along a first direction 112 onto an image plane 120. First direction 112 makes an angle $\theta_1$ with a horizontal direction 130 along the x-axis. In some cases, angle $\theta_1$ is substantially equal to zero. In such cases, the angle $\theta_1$ is less than about 20 degrees, or less than about 15 degrees, or less than about 10 degrees, or less than about 5 degrees, or less than about 3 degrees.

Ambient light source 140, e.g., a room window or door, overhead lighting fixture(s), etc. emits ambient light 141 generally along a second direction 142 that makes an angle $\theta_2$ with horizontal direction 130. In some cases, the angle $\theta_2$ is substantially larger than the angle $\theta_1$. In such cases, the angle $\theta_2$ is greater than the angle $\theta_1$ by at least about 20 degrees, or at least about 30 degrees, or at least about 40 degrees, or at least about 50 degrees, or at least about 60 degrees, or at least about 70 degrees. In some cases, the angle $\theta_2$ is greater than about 40 degrees, or greater than about 50 degrees, or greater than about 60 degrees, or greater than about 70 degrees.

Figure 2:
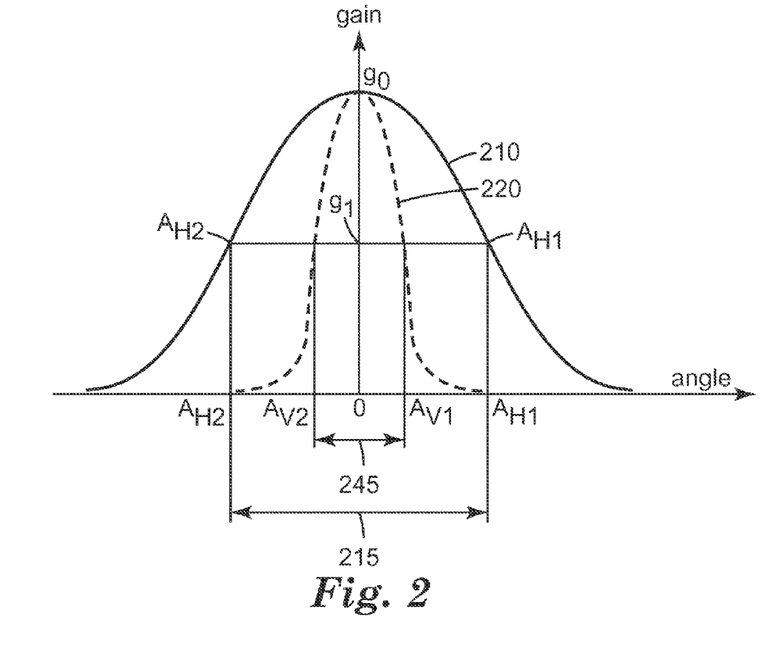
FIG. 2 is schematic plots of horizontal and vertical gain curves for an illustrative projection member for use herein.

Asymmetric optical diffuser 170 scatters an incident light differently along different directions, such as along horizontal direction 130 parallel to the x-direction and along a vertical direction 132 that is parallel to the y-direction. FIG. 2 shows schematic plots of respective horizontal and vertical gain curves 210 and 220 of asymmetric optical diffuser 170 along the mutually orthogonal horizontal and vertical directions. Asymmetric optical diffuser 170 has a maximum gain $g_o$ that corresponds to the on-axis or zero viewing angle and a half-maximum gain $g_1 = g_o/2$ that defines a horizontal viewing angle $A_H$ that is equal to $A_{H1}-A_{H2}$ and a vertical viewing angle $A_V$ that is equal to $A_{V1}-A_{V2}$. $A_{H1}$ and $A_{H2}$ may be referred to as the positive and negative horizontal viewing angle, respectively, and $A_{V1}$ and $A_{V2}$ may be referred to as the positive and negative vertical viewing angles, respectively. In the exemplary gain plots of FIG. 2, each of gain curves 210 and 220 is symmetric about the on-axis viewing direction. In general, gain curves 210 and 220 may or may not be symmetric about the on-axis viewing direction. For example, in some cases, the positive viewing angle $A_{H1}$ corresponding to the half-brightness viewing angle for positive viewing angles may be different than the negative viewing angle $A_{H2}$ corresponding to the half-brightness viewing angle for negative viewing angles.

Referring back to FIG. 1, optical diffuser 170 is an asymmetric diffuser meaning that the horizontal viewing angle $A_H$ is different than the vertical viewing angle $A_V$. In some cases, asymmetric optical diffuser 170 scatters light in a first direction, such as the horizontal direction, with a first viewing angle $A_H$, and in a second direction orthogonal to the first direction, such as the vertical direction, with a second viewing angle $A_V$. In some cases, the ratio $A_H/A_V$ is at least about 2, or at least about 2.2, or at least about 2.5, or at least about 2.7, or at least about 3, or at least about 3.2, or at least about 3.5, or at least about 3.7, or at least about 4. In some cases, the horizontal viewing angle $A_H$ is greater than the vertical viewing angle $A_V$ by at least about 40 degrees, or at least about 50 degrees, or at least about 60 degrees, or at least about 70 degrees, or at least about 80 degrees, or at least about 90 degrees.

Asymmetric optical diffuser 170 is placed in image plane 120 along vertical direction 132. Asymmetric diffuser 170 receives image light 111 and scatters the image light to form a scattered image light 113 propagating generally along a second direction 114. In some cases, directions 112 and 114 are symmetric about the x-axis. In such cases, second direction 114 makes an angle $\theta_1$ with horizontal direction 130. In some cases, scattered image light 113 has a vertical image light cone 115 that includes or covers a desired viewing position 180 that makes an angle $\alpha_V$ with horizontal direction 130.

Asymmetric diffuser 170 receives ambient light 141 and scatters the ambient light to form a scattered ambient light 143 propagating generally along a fourth direction 144. In some cases, directions 142 and 144 are symmetric about horizontal direction 130. In such cases, fourth direction 144 makes an angle $\theta_2$ with horizontal direction 130. In some cases, scattered ambient light 143 has a vertical ambient light cone 145 that does not include or does not cover desired viewing position 180.

In some cases, viewing position 180 is included in, or is positioned within, vertical image light cone 115, but not vertical ambient light cone 145. In such cases, a viewer in viewing position 180 can see an image with high contrast as such an image does not include, or includes very little, ambient light originating from ambient light source 140. In some cases, the vertical viewing angle of asymmetric diffuser 170 is sufficiently large so than vertical image light cone 115 includes or covers viewing position 180, and sufficiently small so that vertical ambient light cone 145 does not include viewing position 180.

Figure 3:
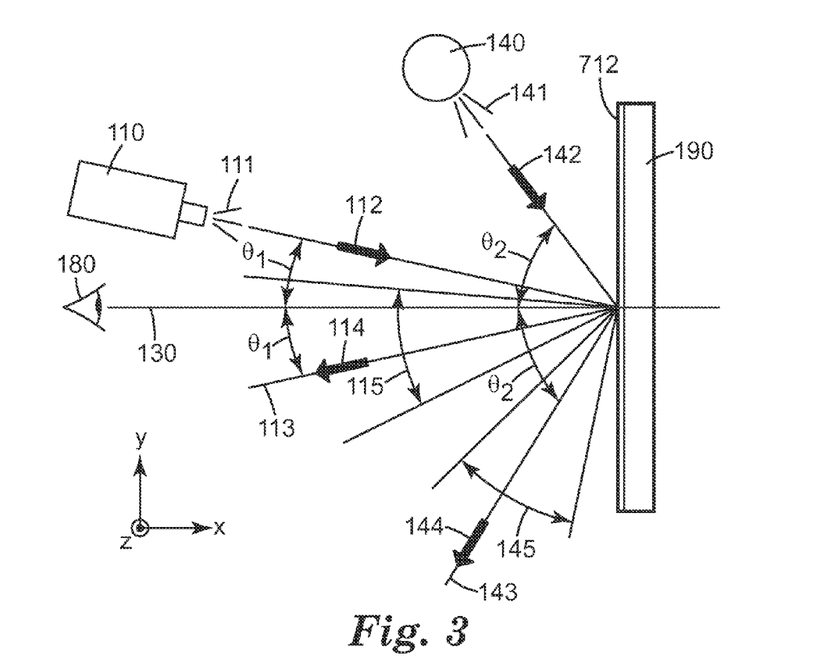
FIG. 3 is a schematic side-view of use of an illustrative projection system of the invention.

In some cases, such as when the angle $\alpha_V$ is substantially equal to zero as shown schematically in FIG. 3, image light that is scattered by asymmetric diffuser 170 reaches viewing position 180 and ambient light that is scattered by the diffuser propagates away from the viewing position. In such cases, the half vertical viewing angle ($A_V/2$) of diffuser 170 is greater than $\theta_1$ and smaller than $\theta_2$. In such cases, a viewer in viewing position 180 observes a displayed image with enhanced contrast.

Reflector 150 reflects image light 155 that is not scattered by optical diffuser 170. In some cases, reflector 150 is substantially a specular reflector. In such cases, a substantial fraction of the total light reflected by reflector 150 is reflected specularly and only a small fraction of the total reflected light is reflected diffusely. For example, in such cases, the ratio of the specular reflectance to the total reflectance of reflector 150 at a visible wavelength is at least about 0.7, or at least about 0.75, or at least about 0.8, or at least about 0.85, or at least about 0.9, or at least about 0.95, where the visible wavelength can be any wavelength in the visible range of the electromagnetic spectrum. In some cases, the visible range is from about 400 nm to about 690 nm, or from about 410 nm to about 680 nm, or from about 420 nm to about 670 nm.

Reflector 150 specularly reflects image light 155 as reflected image light 151 along a fifth direction 152 that makes an angle $\theta_1$ with the horizontal direction. Reflector 150 reflects ambient light 156 that is not scattered by optical diffuser 170. Reflector 150 specularly reflects ambient light 156 as reflected ambient light 153 along a sixth direction 154 that makes an angle $\theta_2$ with the horizontal direction. In some cases, the locations of viewing position 180, image projecting light source 110, and ambient light source 140 are such that a viewer in viewing position 180 receives and views reflected image light 151 but not reflected ambient light 153. In such cases, specular reflector 150 reflects image light 155 that is not scattered by asymmetric optical diffuser 170 towards the viewing position and reflects ambient light 156 that is not scattered by asymmetric optical diffuser 170 away from the viewing position. In such cases, a viewer positioned in viewing position 180 can observe an image with increased contrast.

In some cases, the reflectance of specular reflector 150 does not change, or changes very little, with increasing incident angle. In such cases, specular reflector 150 has a first average reflectance $R_1$ in the visible at an incident angle of about $\theta_1$ and a second average reflectance $R_2$ in the visible at an incident angle of about $\theta_2$, where the difference between $R_1$ and $R_2$ is no more than about 10%, or no more than about 5%, or no more than about 2%. In some cases, the angle $\theta_1$ is about zero and the angle $\theta_2$ is about 45 degrees.

In some cases, the reflectance of specular reflector 150 changes, such as decreases, with increasing incident angle. In some cases, such as when angle $\theta_1$ is substantially less than angle $\theta_2$, a reflector 150 that has decreasing reflectance with increasing incident angle can increase the contrast of an image that is displayed to a viewing position, such as viewing position 180. In some cases, specular reflector 150 has a first average reflectance $R_1$ in the visible at an incident angle of about $\theta_1$ and a second average reflectance $R_2$ in the visible at an incident angle of about $\theta_2$, where the ratio $R_1/R_2$ is at least about 1.2, or at least about 1.4, or at least about 1.5, or at least about 1.6, or at least about 1.8, or at least about 2, or at least about 2.5, or at least about 3. In some cases, the angle $\theta_1$ is about zero and the angle $\theta_2$ is about 45 degrees.

In some cases, specular reflector 150 can have a substantially flat reflectance spectrum in a region, such as the visible region, of the electromagnetic spectrum. For example, in such cases, the reflectance of the specular reflector changes by no more than 20%, or by no more than 15%, or by no more than 10%, or by no more than 5% in the visible. In some cases, the ratio of the reflectance of reflector 150 at a blue wavelength, such as at 440 nm, and the reflectance at a red wavelength, such as at 620 nm, is in a range from about 0.8 to about 1.2, or in a range from about 0.9 to about 1.1.

In general, specular reflector 150 can be any specular reflector that may be desirable and/or practical in an application. For example, specular reflector 150 can be an aluminized film or a multi-layer polymeric reflective film, such as a reflective polarizing film or a VIKUITI™ ESR film available from 3M Company, St. Paul, Minn.

Light absorbing layer 160 can increase the contrast of a displayed image by absorbing image light 161 and ambient light 162 that are not reflected by specular reflector 150. Light absorbing layer 160 can include any light absorbing material that may be desirable and/or practical in an application. For example, layer 160 can include carbon black, light absorptive dyes such as black dyes or other dark dyes, light absorptive pigments or other dark pigments, or opaque particles, dispersed in a binder material. Suitable binders include thermoplastics, radiation curable or thermoset acrylates, epoxies, silicone-based materials, or other suitable binder materials. In some cases, the optical absorption coefficient of light absorbing layer 160 in the visible, is at least about 0.1 inverse microns, or at least about 0.2 inverse microns, or at least about 0.4 inverse microns, or at least about 0.6 inverse microns.

Image projecting light source 110 includes an image forming device and projects an image formed by the device onto display or image plane 120. Output light 111 of projector 110 can have any polarization that may be desirable in an application. For example, in some cases, output light 111 is substantially unpolarized. In such cases, the ratio of the intensity of output light 111 having a first polarization state and the intensity of output light having a second polarization state normal to the first polarization state is in a range from about 0.8 to about 1.2, or from about 0.85 to about 1.15, or from about 0.9 to about 1.1, or from about 0.95 to about 1.05. In some cases, output light 111 is substantially polarized, for example, along a first direction. In such cases, the ratio of the intensity of output light 111 having a first polarization state to the intensity of output light having an orthogonal polarization state is at least about 100, or at least about 500, or at least about 1000. In some cases, output light 110 includes a mixture of polarization states. For example, in some cases, output light 110 can include red, green and blue lights where the blue and red lights have one polarization state and the green light has an orthogonal polarization state.

In general, image projecting light source 110 can include any image forming device. For example, the image forming device can be a reflective display, a transmissive display, or an emissive display, or a combination of different display types, such as a transflective display. For example, in some cases, a reflective image forming device can include an LCD or a digital micro-mirror array display, such as a Digital Light Processor (DLP) display from Texas Instruments, Inc.

In general, asymmetric optical diffuser 170 can be any asymmetric diffuser that may be desirable and/or practical in an application. For example, asymmetric diffuser 170 can be a bulk diffuser and/or a surface diffuser. Bulk diffusion can be achieved by, for example, incorporating or dispersing small particles of a guest material in a host material where the guest and host materials have different indices of refraction. Surface diffusion can be achieved by, for example, making the surface of the diffuser matte.

In some cases, diffuser 170 is a bulk diffuser and the difference between the indices of refraction of the guest and host materials is at least about 0.01, or at least about 0.02, or at least about 0.03, or at least about 0.04.

In some cases, asymmetric optical diffuser 170 can be substantially polarization-insensitive. In such cases, the gain curves, such as horizontal gain curves 210, of the asymmetric optical diffuser for two mutually orthogonal polarized incident lights along a given direction, such as the horizontal direction, are substantially the same. For example, in such cases, horizontal gain curves 210 for two mutually orthogonal polarized incident lights along the horizontal direction differ by no more than about 15%, or by no more than about 10%, or by no more than about 5%. As another example, vertical gain curves 220 for two mutually orthogonal polarized incident lights along the vertical direction differ by no more than about 15%, or by no more than about 10%, or by no more than about 5%.

Figure 4:
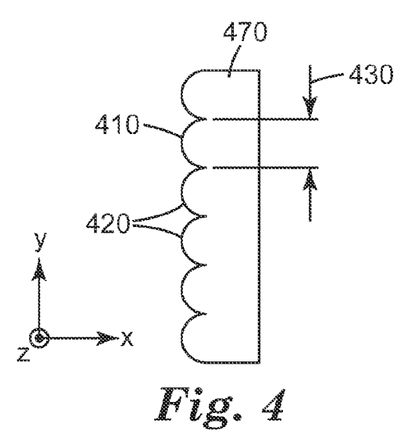
FIG. 4 is a schematic side-view of an optical diffuser.
Figure 5:
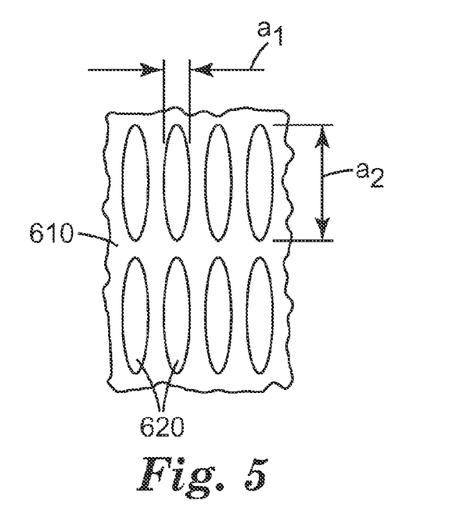

In some cases, asymmetric optical diffuser 170 can include a structured surface or layer. The structured layer can include structures having any shape that may be desirable in an application. Exemplary shapes includes planar, concave, convex, aspheric, Fresnel, ellipsoidal, fibril, diffractive, and faceted shapes. For example, FIG. 4 is a schematic side-view of an asymmetric optical diffuser 470 that includes a structured surface 410 that includes a plurality of optical lenses, such as microlenses, 420 with a pitch 430. In some cases, at least some of the optical lenses can be anamorphic for, for example, altering the aspect ratio of an image projected by image projecting light source 110. In some cases, an anamorphic lens can be or include an elongated, such a cylindrical, lens. In some cases, asymmetric optical diffuser 170 can include an array of elongated optical lenses, such as an array of cylindrical lenses, with a random pitch 430. FIG. 5 is a schematic top-view of a structured surface 610, similar to structured surface 410, that includes a plurality of lenslets 620. Each lenslet has a width $a_1$, a length $a_2$, and an aspect ratio $a_2/a_1$. In some cases, the aspect ratio is in a range from about 1.5 to about 200, or from about 2 to about 100, or from about 2 to about 50, or from about 2 to about 25.

In some cases, asymmetric optical diffuser 170 is a bulk diffuser and includes a plurality of elongated structures or particles of a first material within a second material where the two materials have different indices of refraction. In some cases, the elongated particles are generally oriented along the same direction, such as along vertical direction 132. In some cases, the length of an elongated particle is in a range from about 50 nm to about 100 microns, or from about 100 nm to about 50 microns, or from about 200 nm to about 10 microns. In some cases, the aspect ratio of an elongated particle is in a range from about 5:1 to about 1000:1, or from about 10:1 to about 200:1, or from about 20:1 to about 50:1.

In some cases, optical construction 190 is an integrated construction meaning that the individual components in the construction are attached to one another by, for example, one or more adhesive layers.

In some cases, the article can further comprise an optional substrate 185. In some cases, substrate 185 can primarily provide support for the other components in the article. In some cases, substrate 185 can provide one or more additional optical functions. For example, substrate 185 can be or include an optical diffuser, a broadband light absorber, an absorbing polarizer, a reflective polarizer, or any other film with a function that may be desirable in an application. Substrate 185 can be any material that may be suitable and/or practical in an application, such as polyethylene terapthalate (PET), polyvinyl chloride (PVC), polycarbonates, acrylics, aluminum sheet, and glass, and composites thereof.

Some of the advantages of the disclosed systems and constructions are further illustrated by the following examples. The particular materials, amounts and dimensions recited in this example, as well as other conditions and details, should not be construed to unduly limit the present invention.

EXAMPLES

To form a dry erase layer, a hardcoat composition was prepared according to example 3 of U.S. Pat. No. 6,299,799. The composition included: 18.4 wt % 20 nm silica particles (NALCO™ 2327) surface modified with methacryloyloxypropyltrimethoxysilane (acrylate silane), 25.5 wt % pentaerthritol tri/tetra acrylate (PETA), 4.0 wt % N,N-dimethylacrylamide (DMA), 1.2 wt % IRGACURE™ 184, 1.0 wt % TINUVIN™ 292, 46.9 wt % solvent isopropanol, and 3.0 wt % water. The composition which was approximately 50% solid by weight was then diluted to 30 wt % solid with solvent 1-methoxy 2-propanol/ethyl acetate (1:4 v/v ratio).

To 100 g of the above coating solution, 1.8 g of silica beads (DEGUSSA™ OK607 from Evonik Industries), and 0.03 g of TEGO®rad 2250 (Evonik Industries) were mixed together to form a homogenous solution.

The resulting solution was then applied on top of MELINEX™ 618 primed PET films using a #10 wire-wound rod (obtained from RD Specialties, Webster, N.Y.), respectively. The resulting films were then dried in an oven at 85° C. for 1 min, then cured using a Fusion UV-Systems Inc. Light-Hammer 6 UV (Gaithersburg, Md.) processor equipped with an H-bulb, operating under nitrogen atmosphere at 100% lamp power at a line speed of 30 feet/min (1 passes). The T %/H % of the resulting coating is 90.1% and 47.6%.

Different amount of TEGO®rad 2250 was added to make different coating solutions. The dry-erase property is measured by writing with the indicated markers on the film and then cleaned using dry cloths. The results are summarized in Table 1.

TABLE 1

| Additive | % wt | Marker | Color | Writing | Erasing |
|---|---|---|---|---|---|
| TEGO ® Rad 2250 | 0.5 | SHARPIE ® | Red | X | 1 |
|  |  |  | Green | X | 1 |
|  |  |  | Blue | X | 1 |
|  |  |  | Black | X | 1 |
| TEGO ® Rad 2250 | 0.2 | SHARPIE ® | Red | X | 1 |
|  |  |  | Green | X | 1 |
|  |  |  | Blue | X | 1 |
|  |  |  | Black | X | 1 |
| TEGO ® Rad 2250 | 0.1 | SHARPIE ® | Red | O | 1 |
|  |  |  | Green | O | 1 |
|  |  |  | Blue | O | 1 |
|  |  |  | Black | O | 1 |
| TEGO ® Rad 2250 | 0.06 | SHARPIE ® | Red | O | 2 |
|  |  |  | Green | O | 1 |
|  |  |  | Blue | O | 1 |
|  |  |  | Black | O | 1 |
| TEGO ® Rad 2250 | 0.06 | EXPO ® | Red | O | 1 |
|  |  |  | Green | O | 1 |
|  |  |  | Blue | O | 1 |
|  |  |  | Black | O | 1 |

Writing . . . After writing 5 centimeters crossline with a pen, the ink is not repellent →O: not rejected X: rejected
Erasing . . . The ink on the film can be erased using dry-cloth. →number: lap times of an eraser to erase All patents, patent applications, and other publications cited above are incorporated by reference into this document as if reproduced in full. While specific examples of the invention are described in detail above to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

The invention claimed is:

1. A communication article comprising:
   (a) a writing member having front and rear major surfaces wherein said front major surface is capable of being used as a dry erase surface, said writing member is substantially transparent, and; and
   (b) a projection member disposed on said rear major surface of said writing member, said projection member comprising:
      (1) an asymmetric optical diffuser scattering light in a first direction with a first viewing angle $A_H$, and in a second direction orthogonal to the first direction with a second viewing angle $A_V$, $A_H/A_V$ being at least about 2; and
      (2) a substantially specular reflector reflecting light that is not scattered by the asymmetric optical diffuser.

2. The article of claim 1 wherein said front major surface of said writing member comprises a thermal or radiation curable coating.

3. The article of claim 2 wherein said curable coating comprises a hard coat with nano-particles.

4. The article of claim 3 wherein said nano-particles comprising silica.

5. The article of claim 1 wherein said front major surface of said writing member has an embossed pattern.

6. The article of claim 1 wherein the front major surface of of said writing member has pre-defined average surface roughness Ra ranging from 60 to 1000, as measured by a contacting stylus profilometer.

7. The article of claim 1 wherein the ratio $A_H/A_V$ is at least about 2.5.

8. The article of claim 1 wherein the asymmetric optical diffuser comprises a plurality of elongated structures within a first material, the elongated structures being generally oriented along the second direction.

9. The article of claim 1 wherein the asymmetric optical diffuser is substantially polarization-insensitive.

10. The article of claim 9 wherein gain curves of the asymmetric optical diffuser for two mutually orthogonal polarized incident lights differ by no more than about 10%.

11. The article of claim 9 wherein gain curves of the asymmetric optical diffuser for two mutually orthogonal polarized incident lights differ by no more than about 5%.

12. The article of claim 1 wherein said specular reflector has a first average reflectance $R_o$ in the visible at a substantially zero incident angle and a second average reflectance $R_{45}$ in the visible at a substantially 45 degree incident angle, $R_o/R_{45}$ being at least about 1.5.

13. The article of claim 1 wherein a ratio of a specular reflectance to a total reflectance of the substantially specular reflector at a visible wavelength is at least about 0.7.

14. The article of claim 1 wherein the specular reflector is mirror based on silver or aluminum.

15. The article of claim 1 wherein the specular reflector is a dielectric multilayer.

16. The article of claim 1 wherein a ratio of a specular reflectance to a total reflectance of the substantially specular reflector at a visible wavelength is at least about 0.8.

17. The article of claim 1 wherein a ratio of a specular reflectance to a total reflectance of the substantially specular reflector at a visible wavelength is at least about 0.9.

18. The article of claim 1 wherein the substantially specular reflector comprises a substantially flat reflectance spectrum in the visible.

19. The article of claim 1 wherein the asymmetric optical diffuser comprises a plurality of optical lenses.

20. The article of claim 19 wherein at least some of the plurality of optical lenses are anamorphic.

21. The article of claim 20 wherein at least some of the anamorphic optical lenses comprise cylindrical lenses.

22. The article of claim 1 wherein the asymmetric optical diffuser comprises random holographic optical lenses.

23. The article of claim 1 wherein the asymmetric optical diffuser comprises an array of elongated optical lenses with a random pitch.

24. A projection system comprising:
   a communication article of claim 1;
   an image projecting light source projecting an image light generally along a first direction onto an image plane, the first direction making an angle $\theta_1$ with a horizontal direction;
   an ambient light source emitting ambient light generally along a second direction that makes an angle $\theta_2$ with the horizontal direction;
   an asymmetric optical diffuser placed in the image plane and having a first viewing angle $A_H$ along the horizontal direction and a second viewing angle $A_V$ along a vertical direction orthogonal to the horizontal direction, $A_H/A_V$ being at least about 2; $A_V/2$ being greater than $\theta_1$ and smaller than $\theta_2$; and
   a substantially specular reflector reflecting light that is not scattered by the asymmetric optical diffuser and having a first average reflectance $R_1$ in the visible at an incident angle of about $\theta_1$ and a second average reflectance $R_2$ in the visible at an incident angle of about $\theta_2$, $R_1/R_2$ being at least about 1.5.

* * * * *

UNITED STATES PATENT AND TRADEMARK OFFICE
CERTIFICATE OF CORRECTION

PATENT NO. : 8,220,932 B2
APPLICATION NO. : 12/684565
DATED : July 17, 2012
INVENTOR(S) : Liu et al.

Page 1 of 1

It is certified that error appears in the above-identified patent and that said Letters Patent is hereby corrected as shown below:

In the Specification

Column 2,
Line 65, delete "$R_o$" and insert -- $R_0$ --, therefor.
Line 67, delete "$R_o/R_{45}$" and insert -- $R_0/R_{45}$ --, therefor.

Column 3,
Line 42, delete "and." and insert -- and --, therefor.

Column 9,
Line 67, delete "$a_2/a_i$." and insert -- $a_2/a_1$. --, therefor.

Column 10,
Line 28, delete "terapthalate" and insert -- terephthalate --, therefor.
Line 43-44, delete "pentaerthritol" and insert -- pentaerythritol --, therefor.

In the Claims

Column 11,
Line 59, in claim 6, before "said" delete "of".

Column 12,
Line 12, in claim 12, delete "$R_o$" and insert -- $R_0$ --, therefor.
Line 15, in claim 12, delete "$R_o/R_{45}$" and insert -- $R_0/R_{45}$ --, therefor.

Signed and Sealed this
Nineteenth Day of November, 2013

Teresa Stanek Rea
*Deputy Director of the United States Patent and Trademark Office*